United States Patent
Bian

(10) Patent No.: US 12,449,599 B2
(45) Date of Patent: Oct. 21, 2025

(54) DIRECTIONAL COUPLERS WITH HETEROGENOUS CLADDINGS

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 279 days.

(21) Appl. No.: 18/096,607

(22) Filed: Jan. 13, 2023

(65) Prior Publication Data

US 2024/0241314 A1 Jul. 18, 2024

(51) Int. Cl.
| | |
|---|---|
| *G02B 6/125* | (2006.01) |
| *G02B 6/12* | (2006.01) |
| *G02B 6/124* | (2006.01) |
| *G02B 6/13* | (2006.01) |
| *G02B 6/28* | (2006.01) |

(Continued)

(52) U.S. Cl.
CPC ......... *G02B 6/125* (2013.01); *G02B 6/12004* (2013.01); *G02B 6/124* (2013.01); *G02B 6/13* (2013.01); *G02B 6/2821* (2013.01); *G02B 6/34* (2013.01); *G02F 1/3132* (2013.01); *G02B 2006/12147* (2013.01); *G02B 6/29338* (2013.01)

(58) Field of Classification Search
CPC .............. G02B 6/125; G02B 6/124; G02B 2006/12147; G02B 6/12004; G02B 6/13; G02B 6/2821; G02B 6/34; G02B 6/29338; G02F 1/3132
See application file for complete search history.

(56) References Cited

U.S. PATENT DOCUMENTS 4,483,583 A * 11/1984 Unger .................. G02B 6/2821
385/28
5,715,337 A * 2/1998 Spitzer ............... G02B 27/0172
385/115

(Continued)

OTHER PUBLICATIONS

Madhusudan Mishra and Nikhil Ranjan Das, "Design of a compact silicon photonic directional coupler introducing a hetero-cladding approach," J. Opt. Soc. Am. B 39, 2025-2031 (2022) (Year: 2022).*

(Continued)

*Primary Examiner* — Michelle R Connelly
(74) *Attorney, Agent, or Firm* — Thompson Hine LLP; Anthony Canale

(57) ABSTRACT

Structures for a directional coupler and methods of forming a structure for a directional coupler. The structure comprises a first waveguide core including a first plurality of segments, and a second waveguide core including a second plurality of segments disposed adjacent to the first plurality of segments in a coupling region. The structure further comprises a first cladding layer comprising a first material that has a first refractive index, and a second cladding layer comprising a second material that has a second refractive index different from the first refractive index. The first cladding layer adjoins a first sidewall of each of the first plurality of segments and a first sidewall of each of the second plurality of segments, and the second cladding layer adjoins a second sidewall of each of the first plurality of segments and a second sidewall of each of the second plurality of segments.

20 Claims, 11 Drawing Sheets

(51) Int. Cl.
    *G02B 6/34*     (2006.01)
    *G02F 1/313*     (2006.01)
    *G02B 6/293*     (2006.01)

(56) References Cited

U.S. PATENT DOCUMENTS

| | | | | |
|---|---|---|---|---|
| 5,845,025 | A * | 12/1998 | Garito | G02F 1/3132 252/582 |
| 6,724,968 | B2 * | 4/2004 | Lackritz | G02B 6/124 385/141 |
| 7,110,641 | B2 * | 9/2006 | Benisty | G02B 6/26 385/28 |
| 7,546,014 | B2 | 6/2009 | Yamamoto et al. | |
| 9,563,016 | B1 * | 2/2017 | Xu | G02F 1/0147 |
| 10,795,083 | B1 | 10/2020 | Bian et al. | |
| 10,983,273 | B1 * | 4/2021 | Phare | G01S 17/42 |
| 2005/0207705 | A1 * | 9/2005 | Laurent-Lund | G02B 6/2813 385/45 |
| 2006/0140541 | A1 * | 6/2006 | Gorni | G02B 6/29383 385/50 |
| 2010/0178005 | A1 * | 7/2010 | Okayama | G02B 6/12007 385/50 |
| 2016/0025928 | A1 | 1/2016 | Onawa | |
| 2019/0154933 | A1 * | 5/2019 | Carothers | G02B 6/3652 |
| 2020/0284956 | A1 * | 9/2020 | Tortschanoff | G02B 6/02085 |
| 2021/0294035 | A1 * | 9/2021 | Bian | G02B 6/26 |
| 2022/0137295 | A1 * | 5/2022 | Grillanda | G02B 6/12028 385/131 |
| 2022/0413232 | A1 | 12/2022 | Porter et al. | |

OTHER PUBLICATIONS

Wei Shi, Xu Wang, Charlie Lin, Han Yun, Yang Liu, Tom Baehr-Jones, Michael Hochberg, Nicolas A. F. Jaeger, and Lukas Chrostowski, "Silicon photonic grating-assisted, contra-directional couplers," Opt. Express 21, 3633-3650 (2013) (Year: 2013).*

Mishra et al. ("Design of a compact silicon photonic directional coupler introducing a hetero-cladding approach", Journal of Optical Society of America B, vol. 39, No. 9, Aug. 2022, pp. 2025-2031). (Year: 2022).*

Madhusudan Mishra and Nikhil Ranjan Das, "Design of a compact silicon photonic directional coupler introducing a hetero-cladding approach," Journal of the Optical Society of America B, vol. 39, Issue 8, pp. 2025-2031 (2022).

Zeqin Lu et al., "Broadband silicon photonic directional coupler using asymmetric-waveguide based phase control," Optics Express 23, 3795-3808 (2015).

Li, C., Zhang, M., Xu, H. et al. "Subwavelength silicon photonics for on-chip mode-manipulation." PhotoniX 2, 11 (2021). https://doi.org/10.1186/s43074-021-00032-2.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al, "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B. Peng et al., "A CMOS Compatible Monolithic Fiber Attach Solution with Reliable Performance and Self-alignment," In Optical Fiber Communication Conference (OFC) 2020, OSA Technical Digest (Optica Publishing Group, 2020), paper Th31.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

European Patent Office, Extended European Search Report and Opinion issued in European Patent Application No. 23205378.5 on Sep. 2, 2024; 8 pages.

European Patent Office, Communication under Rule 71(3) EPC, Intention to Grant, issued in European Patent Application No. 23205378.5 on Apr. 30, 2025; 8 pages.

European Patent Office, Communication under Rule 71(3) EPC, Corrected Intention to Grant, issued in European Patent Application No. 23205378.5 on Jun. 26, 2025; 8 pages.

* cited by examiner

DIRECTIONAL COUPLERS WITH HETEROGENOUS CLADDINGS

BACKGROUND

The disclosure relates to photonics chips and, more specifically, to structures for a directional coupler and methods of forming a structure for a directional coupler.

Photonics chips are used in many applications and systems including, but not limited to, data communication systems and data computation systems. A photonics chip may integrate optical components and electronic components into a unified platform. Among other factors, layout area, cost, and operational overhead may be reduced by the integration of both types of components on the same chip.

A directional coupler is employed on a photonics chip to split propagating optical signals between different waveguide cores. A directional coupler includes sections of the different waveguide cores that are separated by a gap that is selected to promote optical coupling over a given coupling length. The dimension of the gap between the sections of the waveguide cores may be reduced to enhance the coupling strength and reduce the device footprint. However, reducing the dimension of the gap may increase the difficulty in patterning the gap between the waveguide cores and the difficulty in subsequently filling the gap with dielectric material. For example, air voids may be created within the dielectric material during deposition.

Improved structures for a directional coupler and methods of forming a structure for a directional coupler are needed.

SUMMARY

In an embodiment of the invention, a structure for a directional coupler is provided. The structure comprises a first waveguide core including a first plurality of segments arranged along a first longitudinal axis, and a second waveguide core including a second plurality of segments arranged along a second longitudinal axis. Each of the first plurality of segments has a first sidewall and a second sidewall opposite to the first sidewall, each of the second plurality of segments has a first sidewall and a second sidewall opposite to the first sidewall, and the first sidewall of each of the second plurality of segments is disposed adjacent to the first sidewall of one of the first plurality of segments in a coupling region. The structure further comprises a first cladding layer comprising a first material that has a first refractive index, and a second cladding layer comprising a second material that has a second refractive index different from the first refractive index. The first cladding layer adjoins the first sidewall of each of the first plurality of segments and the first sidewall of each of the second plurality of segments, and the second cladding layer adjoins the second sidewall of each of the first plurality of segments and the second sidewall of each of the second plurality of segments.

In an embodiment of the invention, a structure for a directional coupler is provided. The structure comprises a first waveguide core having a first sidewall and a second sidewall opposite to the first sidewall, and a second waveguide core having a first sidewall and a second sidewall opposite to the first sidewall. The first sidewall of the second waveguide core spaced from the first sidewall of the first waveguide core by a gap in a coupling region. The structure further comprises a first cladding layer comprising a first material that has a first refractive index, and a second cladding layer comprising a second material that has a second refractive index different from the first refractive index. The first cladding layer includes a first plurality of sections in the gap, the second cladding layer includes a second plurality of sections in the gap, and the second plurality of sections of the second cladding layer alternate with the first plurality of sections of the first cladding layer.

In an embodiment of the invention, a method of forming a structure for a directional coupler is provided. The method comprises forming a first waveguide core including a first plurality of segments arranged along a first longitudinal axis, and forming a second waveguide core including a second plurality of segments arranged along a second longitudinal axis. Each of the first plurality of segments has a first sidewall and a second sidewall opposite to the first sidewall, each of the second plurality of segments has a first sidewall and a second sidewall opposite to the first sidewall, and the first sidewall of each of the second plurality of segments is disposed adjacent to the first sidewall of one of the first plurality of segments in a coupling region. The method further comprises forming a first cladding layer comprised of a first material having a first refractive index, and forming a second cladding layer comprised of a second material that has a second refractive index different from the first refractive index. The first cladding layer adjoins the first sidewall of each of the first plurality of segments and the first sidewall of each of the second plurality of segments, and the second cladding layer adjoins the second sidewall of each of the first plurality of segments and the second sidewall of each of the second plurality of segments.

BRIEF DESCRIPTION OF THE DRAWINGS

The accompanying drawings, which are incorporated in and constitute a part of this specification, illustrate various embodiments of the invention and, together with a general description of the invent ion given above and the detailed description of the embodiments given below, serve to explain the embodiments of the invention. In the drawings, like reference numerals refer to like features in the various views.

DETAILED DESCRIPTION

Figure 1:
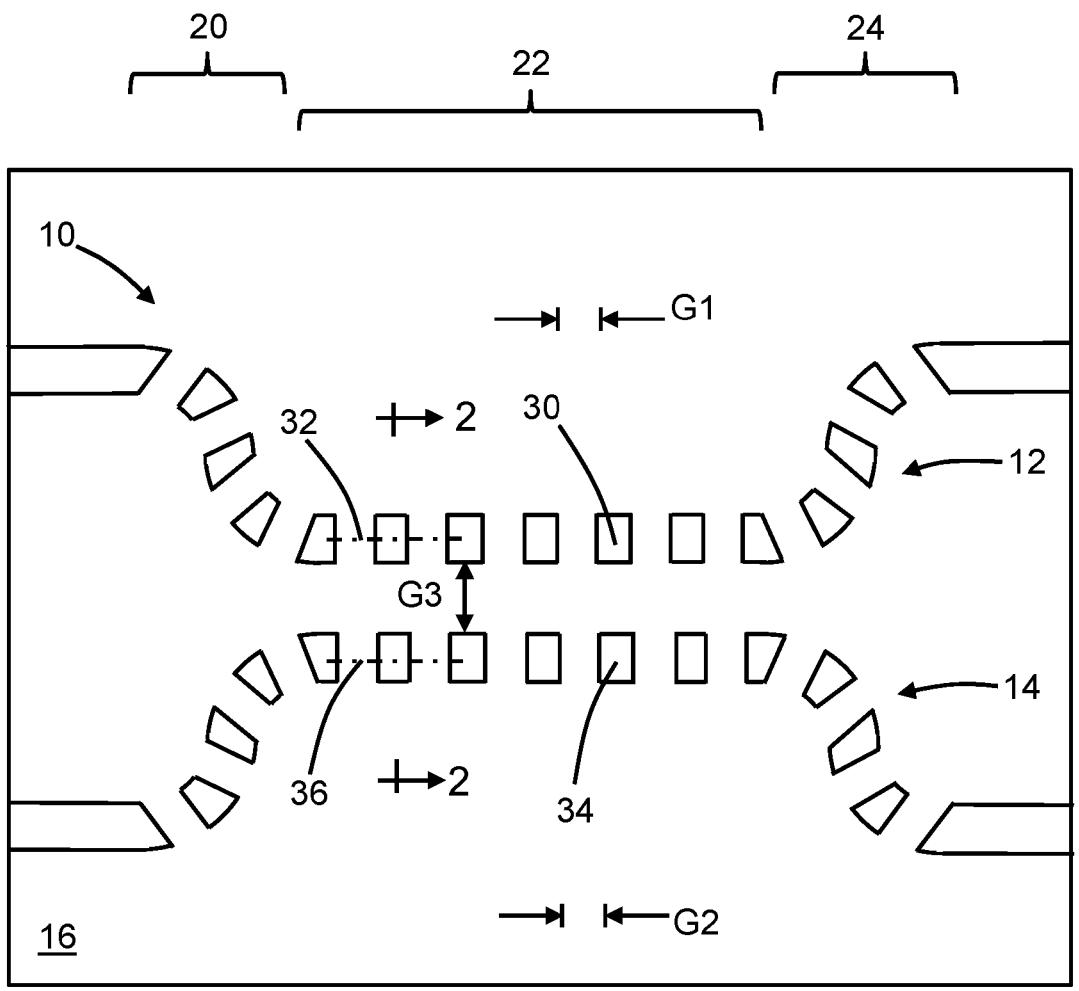
FIG. 1 is a top view of a structure at an initial fabrication stage of a processing method in accordance with embodiments of the invention.
Figure 2:
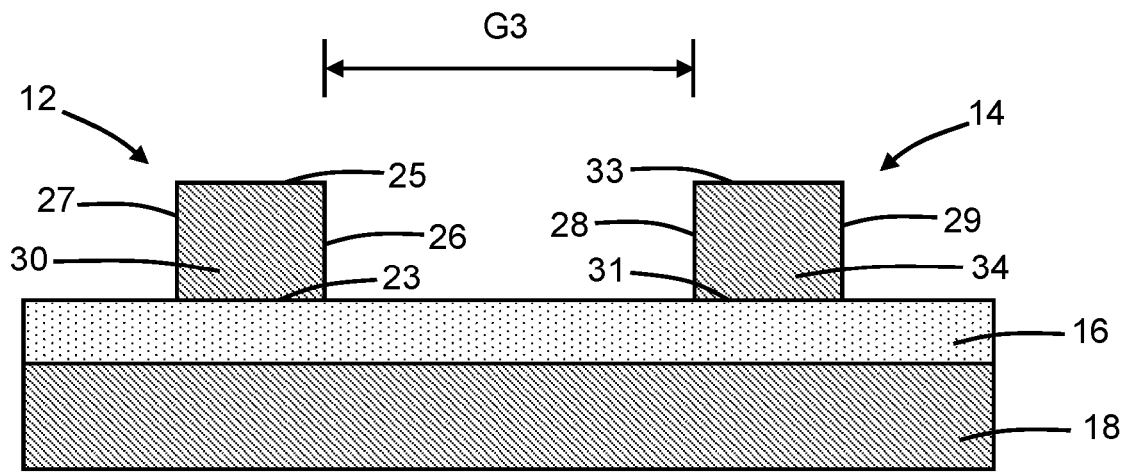
FIG. 2 is a cross-sectional view taken generally along line 2-2 in FIG. 1.

With reference to FIGS. 1, 2 and in accordance with embodiments of the invention, a structure 10 for a directional coupler includes a waveguide core 12 and a waveguide core 14 that are positioned on, and over, a dielectric layer 16 and a semiconductor substrate 18. In an embodiment, the dielectric layer 16 may be comprised of a dielectric material, such as silicon dioxide, and the semiconductor substrate 18 may be comprised of a semiconductor material, such as single-crystal silicon. In an embodiment, the dielectric layer 16 may be a buried oxide layer of a silicon-on-insulator substrate, and the dielectric layer 16 may be disposed between the waveguide cores 12, 14 and the semiconductor substrate 18. The dielectric layer 16 may function as an underlying cladding layer for the waveguide cores 12, 14.

The waveguide core 12 includes multiple segments 30 that are distributed in an input region 20, a coupling region 22, and an output region 24. The segments 30 are positioned in a spaced-apart arrangement in which spaces or gaps G1 alternate with the segments 30. In the coupling region 22, the segments 30 alternate with the gaps G1 along the longitudinal axis 32. In the input region 20 and the output region 24, the segments 30 may be arranged with curved routing that approximates respective bends. In an embodiment, the pitch and duty cycle of the segments 30 may be uniform to define a periodic arrangement. In alternative embodiments, the pitch and/or the duty cycle of the segments 30 may be apodized (i.e., non-uniform) to define a non-periodic arrangement. In an alternative embodiment, a rib may be overlaid with some or all of the segments 30.

The waveguide core 14 includes multiple segments 34 that are distributed in the input region 20, the coupling region 22, and the output region 24. The segments 34 are positioned in a spaced-apart arrangement in which spaces or gaps G2 alternate with the segments 34. In the coupling region 22, the segments 34 and the gaps G2 alternate along the longitudinal axis 36. In the input region 20 and the output region 24, the segments 34 may be arranged with curved routing that approximates respective bends. In an embodiment, the pitch and duty cycle of the segments 34 may be uniform to define a periodic arrangement. In alternative embodiments, the pitch and/or the duty cycle of the segments 34 may be apodized (i.e., non-uniform) to define a non-periodic arrangement. In an alternative embodiment, a rib may be overlaid with some or all of the segments 34.

Each segment 30 has a sidewall 26, a sidewall 27 opposite to the sidewall 26, a bottom surface 23 adjacent to the dielectric layer 16, and a top surface 25 opposite to the bottom surface 23. The sidewalls 26, 27 extend in a vertical direction from the bottom surface 23 to the top surface 25. Each segment 34 has a sidewall 28, a sidewall 29 opposite to the sidewall 28, a bottom surface 31 adjacent to the dielectric layer 16, and a top surface 33 opposite to the bottom surface 31. The sidewalls 28, 29 extend in a vertical direction from the bottom surface 31 to the top surface 33.

The segments 30 of the waveguide core 12 may be spaced from the segments 34 of the waveguide core 14 by a gap G3 in the coupling region 22. More specifically, the segments 30 and the segments 34 may be arranged in the coupling region 22 such that the sidewall 26 of each segment 30 is disposed across the gap G3 from the sidewall 28 of one of the segments 34. In an embodiment, the longitudinal axis 32 may be arranged parallel to the longitudinal axis 36 in the coupling region 22. In an embodiment, the segments 30 and the segments 34 may be characterized by the same pitch and/or duty cycle. In an embodiment, the segments 30 may be characterized by a different pitch and/or duty cycle than the segments 34. In an embodiment, the segments 30 may have a width in a direction transverse to the longitudinal axis 32, the segments 34 may have a width in a direction transverse to the longitudinal axis 36, and the width of the segments 30 may be equal to the width of the segments 34. In an embodiment, the segments 30 may have a width transverse to the longitudinal axis 32, the segments 34 may have a width in a direction transverse to the longitudinal axis 36, and the width of the segments 30 may be unequal to the width of the segments 34. The segments 30 are spaced from the segments 34 by a distance greater than the gap G3 in the input region 20 and in the output region 24.

In an embodiment, the waveguide cores 12, 14 may be comprised of a material having a refractive index that is greater than the refractive index of silicon dioxide. In an embodiment, the waveguide cores 12, 14 may be comprised of a semiconductor material. In an embodiment, the waveguide cores 12, 14 may be comprised of single-crystal silicon. In an embodiment, the waveguide cores 12, 14 may be comprised of polysilicon or amorphous silicon. In an embodiment, the waveguide cores 12, 14 may be comprised of a dielectric material, such as silicon nitride, silicon oxynitride, or aluminum nitride.

In an embodiment, the waveguide cores 12, 14 may be formed by patterning a layer comprised of their constituent material with lithography and etching processes. In an embodiment, an etch mask may be formed by a lithography process over the layer to be patterned, and unmasked sections of the deposited layer may be etched and removed with an etching process. In an embodiment, the waveguide cores 12, 14 may be formed by patterning the semiconductor material (e.g., single-crystal silicon) of a device layer of a silicon-on-insulator substrate. In an embodiment, the waveguide cores 12, 14 may be formed by patterning a deposited layer comprised of their constituent material (e.g., silicon nitride, polysilicon, or amorphous silicon). In an alternative embodiment, a slab layer may be connected to respective lower portions of the segments 30, 34 of the waveguide cores 12, 14. The slab layer, which may be formed when the waveguide cores 12, 14 are patterned, has a thickness that is less than the thickness of the segments 30 and less than the thickness of the segments 34.

Figure 3:
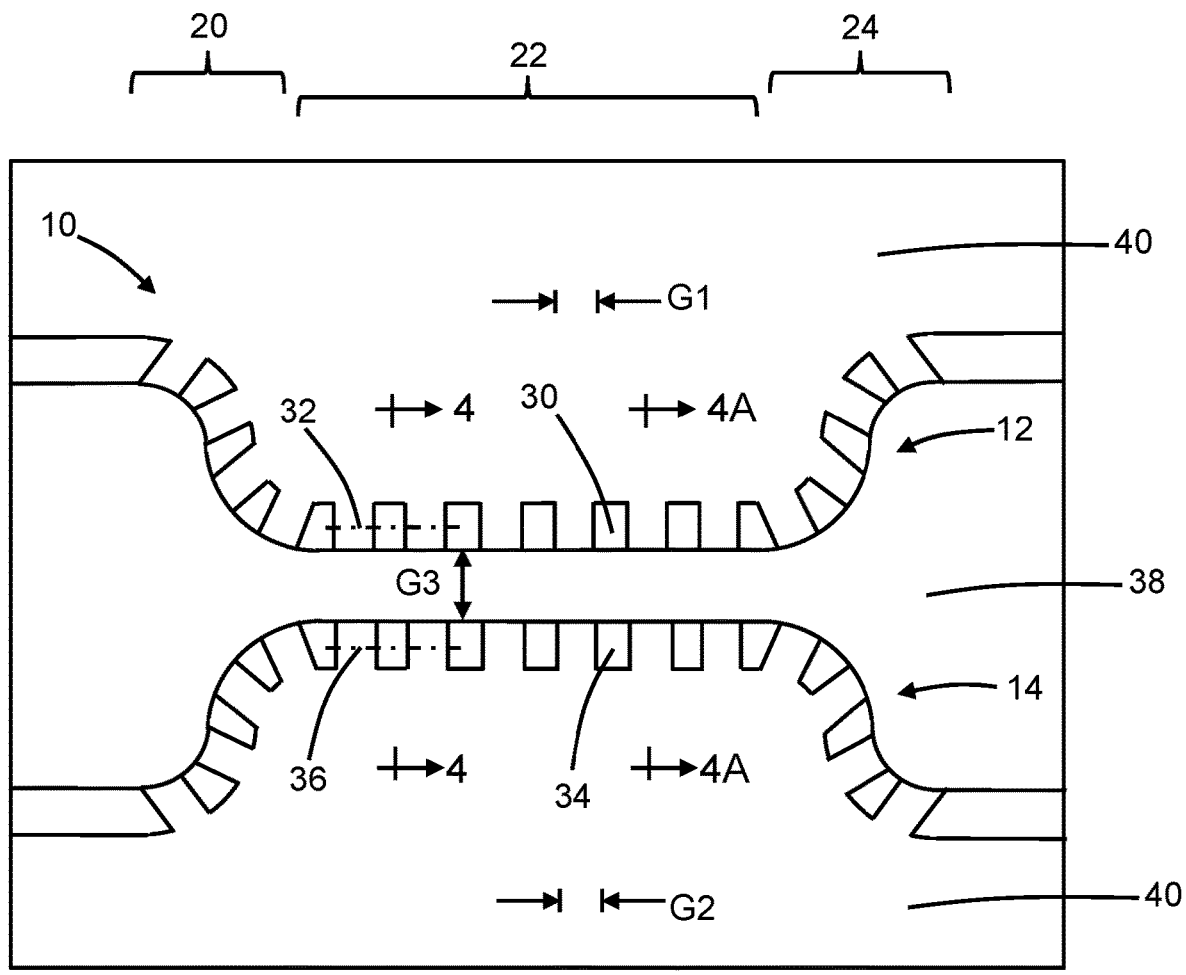
FIG. 3 is a top view of the structure at a fabrication stage subsequent to FIG. 1.
Figure 4:
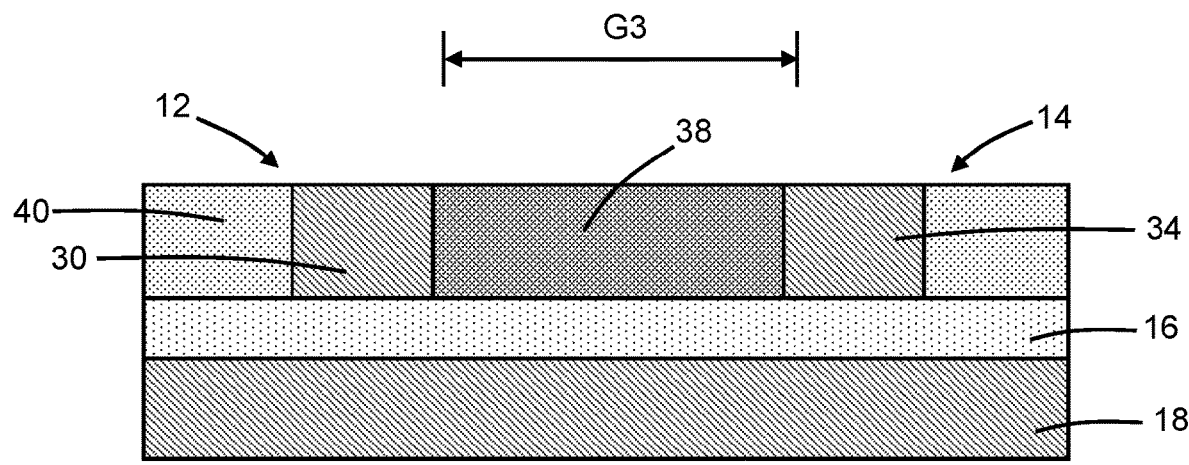
FIG. 4 is a cross-sectional view taken generally along line 4-4 in FIG. 3.
Figure 4A:
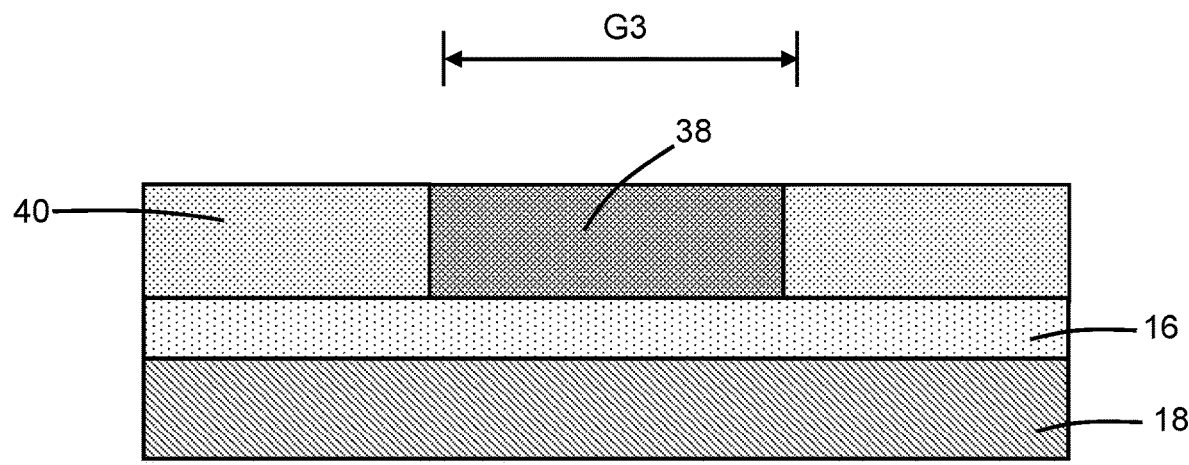
FIG. 4A is a cross-sectional view taken generally along line 4A-4A in FIG. 3.

With reference to FIGS. 3, 4, 4A in which like reference numerals refer to like features in FIGS. 1, 2 and at a subsequent fabrication stage, a cladding layer 38 may be disposed between the waveguide core 12 and the waveguide core 14 in the coupling region 22. In particular, the cladding layer 38 may be disposed inside the gaps G3 between the segments 30 of the waveguide core 12 and the segments 34 of the waveguide core 14. The material of the cladding layer 38 may adjoin the inner sidewall 26 of each segment 30, and the material of the cladding layer 38 may adjoin the inner sidewall 28 of each segment 34. The cladding layer 38 may also disposed in the space between the segments 30 and the segments 34 in the input region 20 and the space between the segments 30 and the segments 34 in the output region 24. The cladding layer 38 may be deposited and planarized after deposition, and then patterned with lithography and etching processes.

A cladding layer 40 may be disposed inside the gaps G1 between the segments 30 of the waveguide core 12 and the gaps G2 between the segments 34 of the waveguide core 14, as well as in the space between the segments 30 in the input region 20 and the segments 30 in the output region 24 and in the space between the segments 34 in the input region 20 and the segments 34 in the output region 24. The material of the cladding layer 40 may adjoin the outer sidewall 27 of each segment 30, and the material of the cladding layer 40 may adjoin the outer sidewall 29 of each segment 34. The cladding layer 40 may be deposited and planarized after deposition, and then patterned with lithography and etching processes.

In an embodiment, the cladding layer 38 may be deposited and patterned before depositing the cladding layer 40, the gaps G1 and the gaps G2 may be unfilled following the patterning of the cladding layer 38, and the material of the subsequently-deposited cladding layer 40 may fill the gaps G1 and the gaps G2. In an alternative embodiment, the cladding layer 40 may be deposited and patterned before depositing the cladding layer 38, the gap G3 may be unfilled following the patterning of the cladding layer 40, and the material of the subsequently-deposited cladding layer 38 may fill the gap G3.

The cladding layer 38 may be comprised of a material having a refractive index that is less than the refractive index of the material constituting the waveguide cores 12, 14. The cladding layer 40 may also be comprised of a material having a refractive index that is less than the refractive index of the material constituting the waveguide cores 12, 14. The refractive index of the material of the cladding layer 40 may be different from the refractive index of the of the cladding layer 38. In an embodiment, the refractive index of the material of the cladding layer 40 may be less than the refractive index of the material of the cladding layer 38. In an embodiment, the refractive index of the material of the cladding layer 40 may be greater than the refractive index of the material of the cladding layer 38. In an embodiment, the cladding layers 38, 40 may be dielectric materials selected from silicon nitride, aluminum nitride, silicon oxynitride, diamond, aluminum oxide, calcium fluoride, carbon-doped silicon oxide, tetraethylorthosilicate silicon dioxide, fluorinated-tetraethylorthosilicate silicon dioxide, and magnesium fluoride. In an embodiment, the cladding layer 38 may be comprised of silicon nitride, and the cladding layer 40 may be comprised of silicon dioxide. In an embodiment, the cladding layers 38, 40 may be comprised of respective non-ferroelectric materials with different refractive indices.

In an embodiment, the cladding layer 38 and the cladding layer 40 may have equal thicknesses. In an embodiment, the cladding layer 38 and the cladding layer 40 may have unequal thicknesses. In an embodiment, the cladding layer 38 may be thicker than the cladding layer 40. In an embodiment, the cladding layer 38 may be thinner than the cladding layer 40. In an embodiment, the cladding layer 38 and/or the cladding layer 40 may have respective thicknesses that are equal to the thicknesses of the segments 30, 34. In an embodiment, the cladding layer 38 and/or the cladding layer 40 may have respective thicknesses that are not equal to the thicknesses of the segments 30, 34.

In an embodiment, the dielectric material of the dielectric layer 16 may have a refractive index that is equal or substantially equal to the refractive index of the material of the cladding layer 38. In an embodiment, the dielectric material of the dielectric layer 16 may have a refractive index that is equal or substantially equal to the refractive index of the material of the cladding layer 40. In an embodiment, the dielectric material of the dielectric layer 16 may have a refractive index that is different from the refractive index of the material of the cladding layer 38 and/or different from the refractive index of the material of the cladding layer 40.

In an embodiment, the segments 30 of the waveguide core 12 may be dimensioned and positioned at small enough pitch so as to define a sub-wavelength grating that does not radiate or reflect light at a wavelength of operation, and the segments 34 of the waveguide core 14 may be dimensioned and positioned at small enough pitch so as to define a sub-wavelength grating that does not radiate or reflect light at a wavelength of operation. The material of the cladding layer 40 is disposed in the gaps G1 between adjacent pairs of the segments 30 such that a metamaterial structure is defined in which the material constituting the segments 30 has a higher refractive index than the material of the cladding layer 40. The material of the cladding layer 40 is disposed in the gaps G2 between adjacent pairs of the segments 34 such that a metamaterial structure is defined in which the material constituting the segments 34 has a higher refractive index than the material of the cladding layer 40. Each metamaterial structure can be treated as a homogeneous material having an effective refractive index that is intermediate between the refractive index of the material constituting the segments 30, 34 and the refractive index of the material constituting the cladding layer 40.

Figure 5:
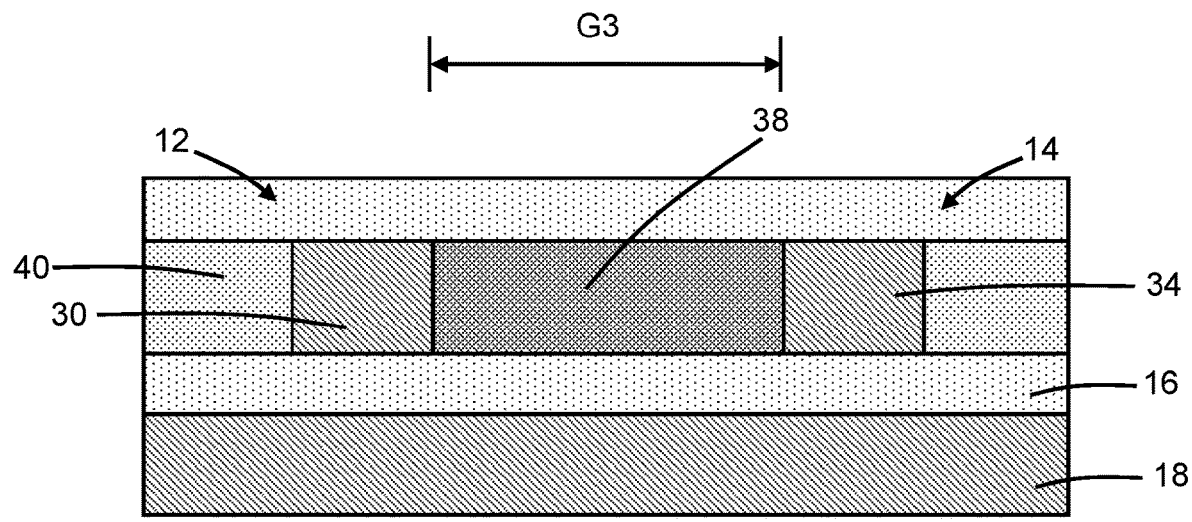
FIGS. 5, 5A are cross-sectional views of the structure at a fabrication stage subsequent to FIG. 3.
Figure 5A:
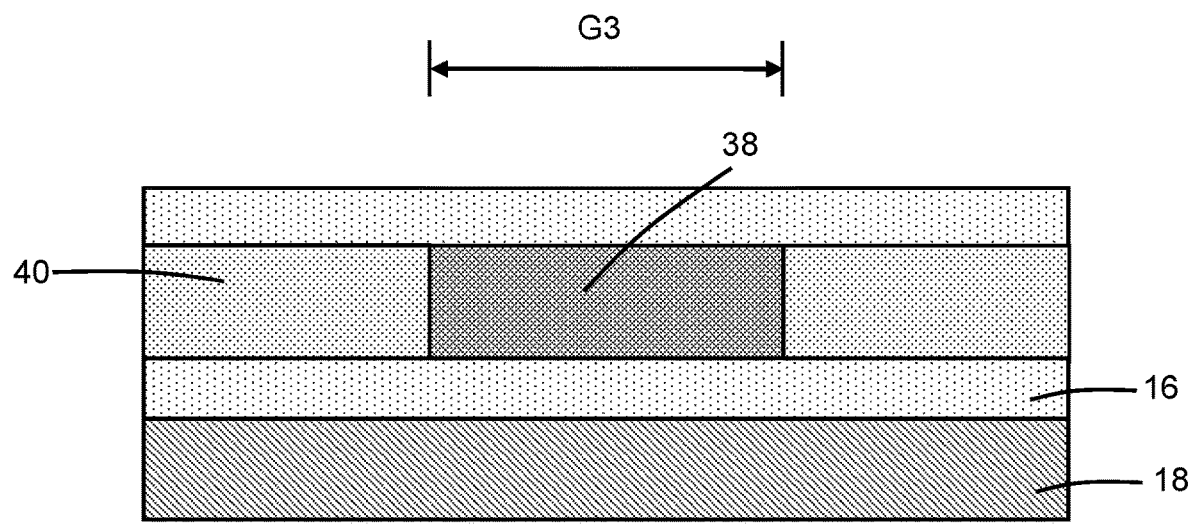

With reference to FIGS. 5, 5A in which like reference numerals refer to like features in FIGS. 4, 4A and at a subsequent fabrication stage, a dielectric layer 42 is formed on, and over, the waveguide cores 12, 14 and the cladding layers 38, 40. The dielectric layer 42 may be comprised of a dielectric material, such as silicon dioxide, having a refractive index that is less than the refractive index of the material constituting the waveguide cores 12, 14. In an embodiment, the dielectric material of the dielectric layer 42 may have a refractive index that is equal or substantially equal to the refractive index of the material of the cladding layer 38. In an embodiment, the dielectric material of the dielectric layer 42 may have a refractive index that is equal or substantially equal to the refractive index of the material of the cladding layer 40. In an embodiment, the dielectric material of the dielectric layer 42 may have a refractive index that is different from the refractive index of the material of the cladding layer 38 and/or different from the refractive index of the material of the cladding layer 40. The dielectric layer 42 may be disposed on the top surface 25 of each segment 30 and the top surface 33 of each segment 30, and the dielectric layer 42 may function as an overlying cladding layer for the waveguide cores 12, 14.

In use, light (e.g., laser light) may be guided on a photonics chip by the waveguide core 12 to the input region 20 of the directional coupler. In the coupling region 22, all or a portion of the arriving light is transferred in a lateral direction from the segments 30 of the waveguide core 12 to the segments 34 of the waveguide core 14. Light may exit the directional coupler via the waveguide core 12 and the waveguide core 14 in the output region 24.

The waveguide core 12 and the waveguide core 14 define a directional coupler that includes inhomogeneous or heterogenous lateral claddings supplied by the cladding layer 38 and the cladding layer 40 that are comprised materials of different refractive index. The heterogenous lateral claddings of different refractive index may permit the dimension of the gap G3 between the segments 30 of the waveguide core 12 and the segments 34 of the waveguide core 14 in the coupling region 22 to be increased without reducing the coupling strength and may also permit a significant reduction in the device footprint. As a result of the relaxation on the restriction on the dimension of the gap G3, the cladding layer 38 may be deposited with a significantly reduced risk of forming air voids in the gap G3.

Figure 6:
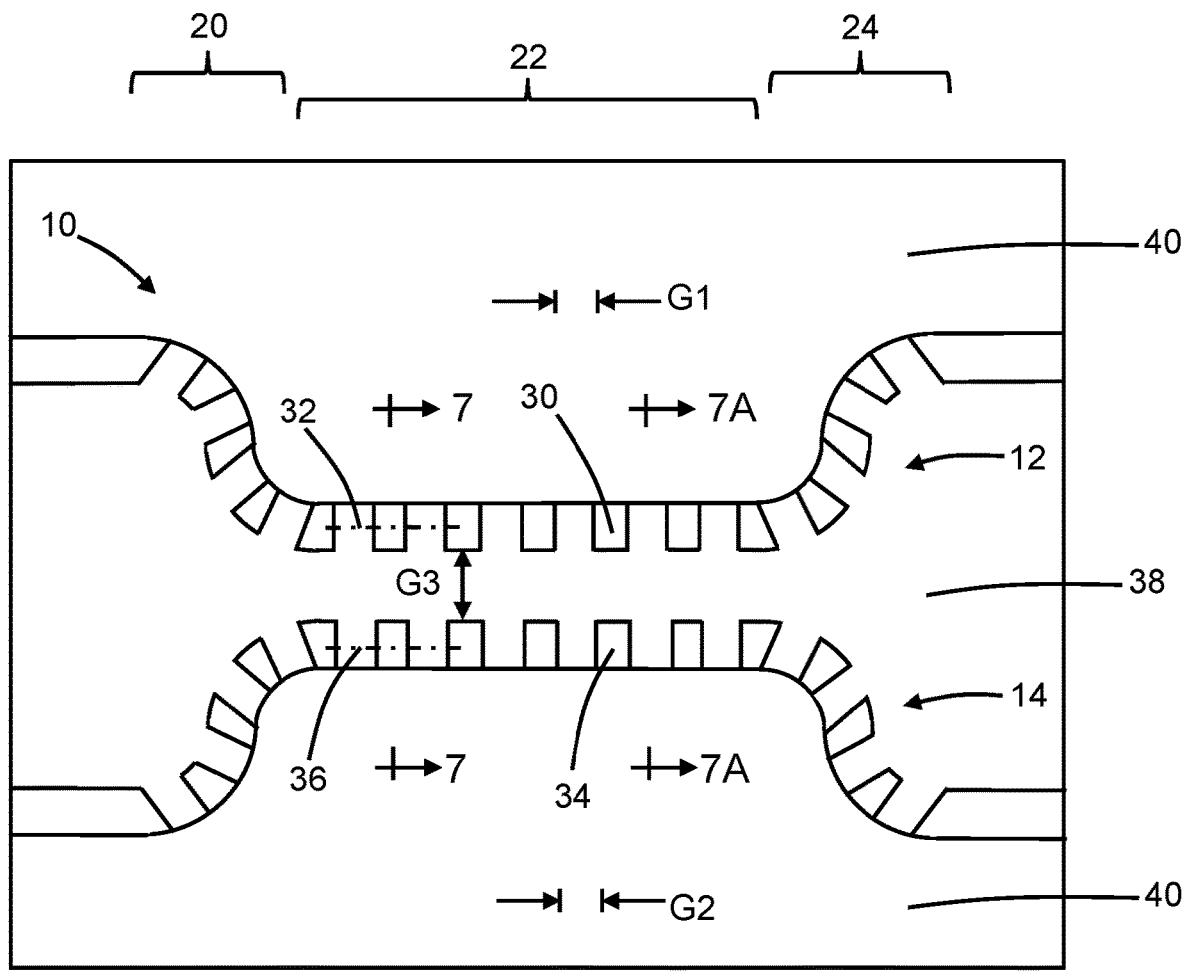
FIG. 6 is a top view of a structure in accordance with alternative embodiments of the invention.
Figure 7:
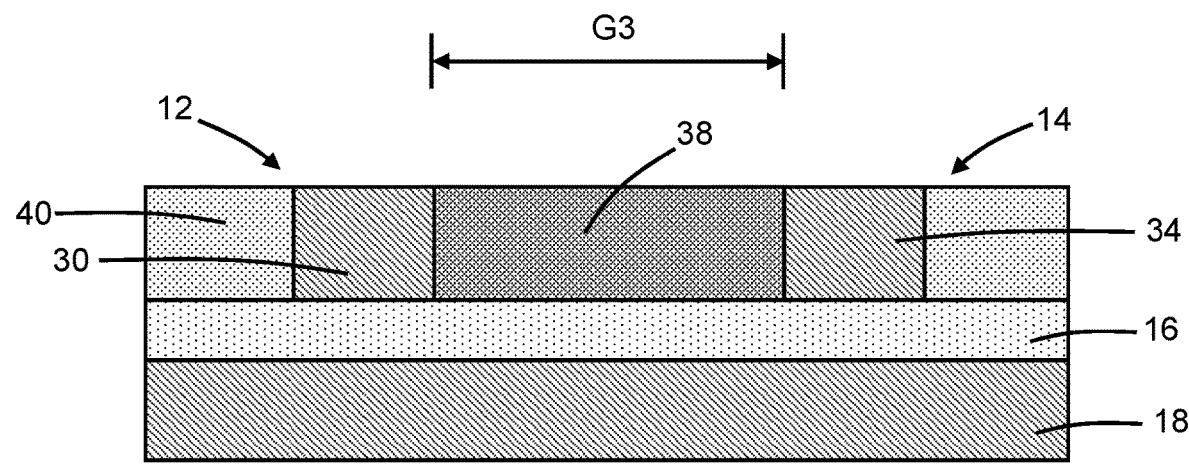
FIG. 7 is a cross-sectional view taken generally along line 7-7 in FIG. 6.
Figure 7A:
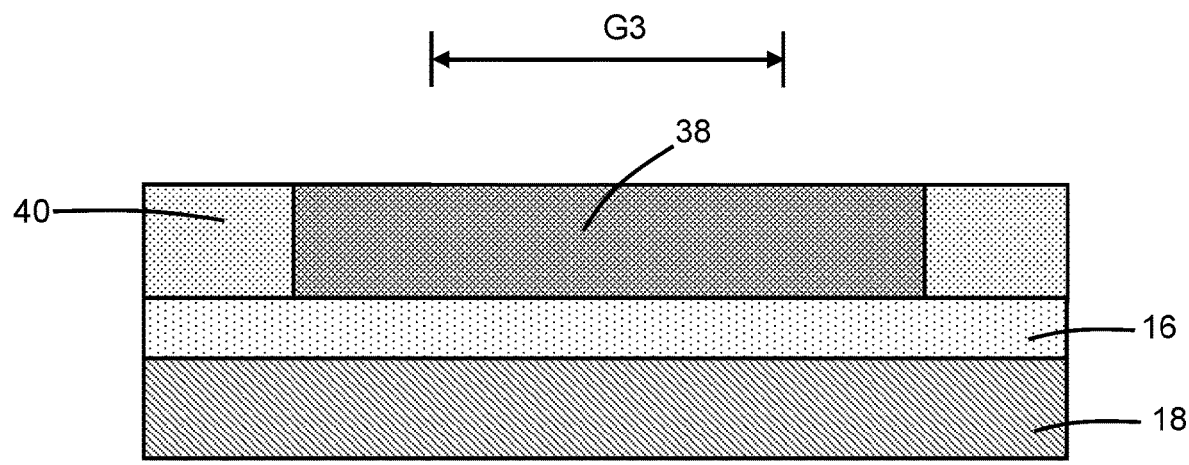
FIG. 7A is a cross-sectional view taken generally along line 7A-7A in FIG. 6.

With reference to FIGS. 6, 7, 7A and in accordance with alternative embodiments, the cladding layer 38 may be disposed inside the gaps G1 between the segments 30 of the waveguide core 12 and the gaps G2 between the segments 34 of the waveguide core 14 instead of the cladding layer 40. The cladding layer 38 is disposed in the space between the segments 30 in the input region 20 and the segments 30 in the output region 24 and in the space between the segments 34 in the input region 20 and the segments 34 in the output region 24. The material of the cladding layer 38 may also adjoin the inner sidewall 26 of each segment 30, and the material of the cladding layer 38 may also adjoin the inner sidewall 28 of each segment 34. The material of the cladding layer 40 may adjoin the outer sidewall 27 of each segment 30, and the material of the cladding layer 40 may adjoin the outer sidewall 29 of each segment 34.

Figure 8:
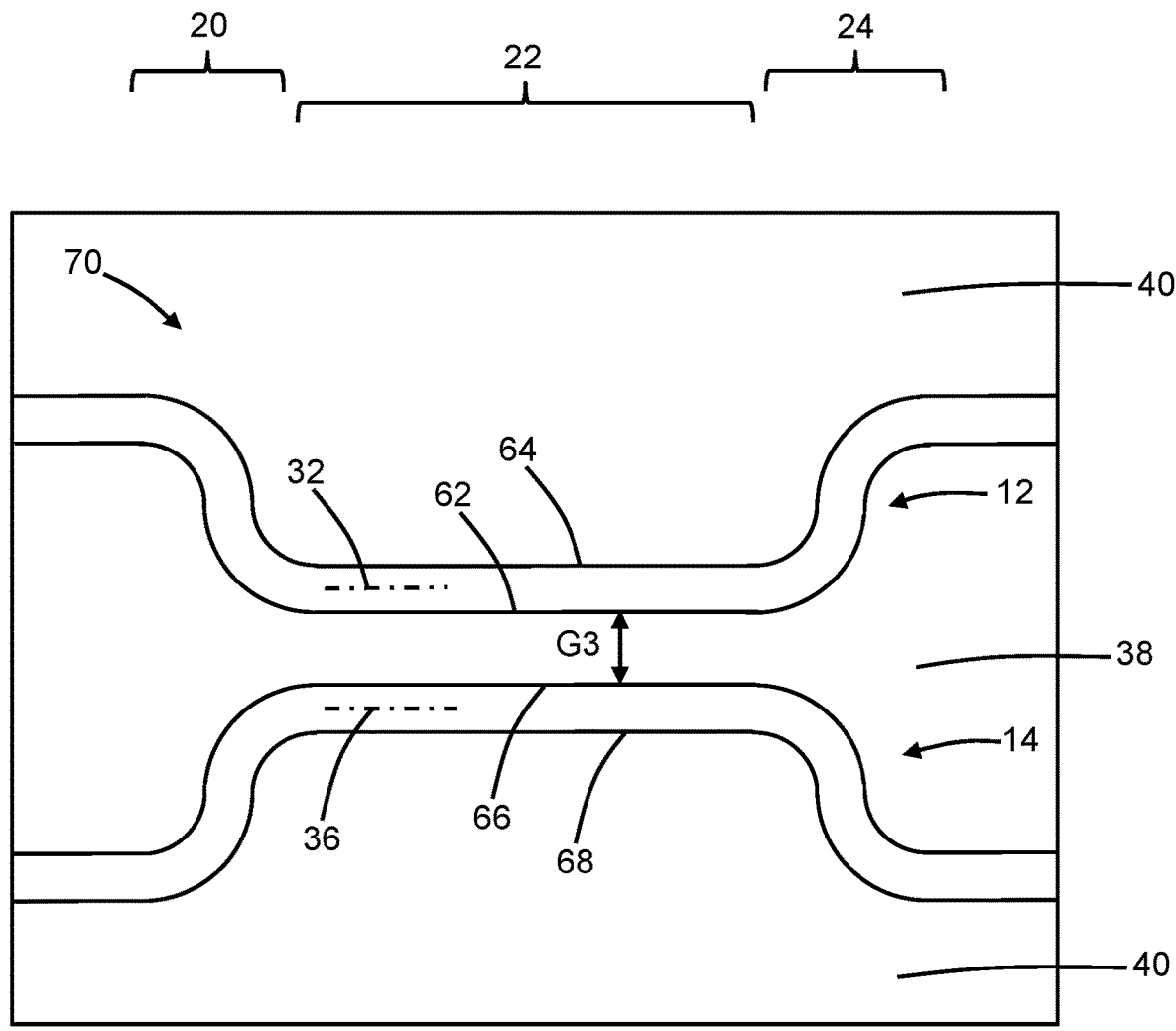
FIG. 8 is a top view of a structure in accordance with alternative embodiments of the invention.

With reference to FIG. 8 and in accordance with alternative embodiments, a structure 70 may include waveguide cores 12, 14 that are continuous and non-segmented in the input region 20, the coupling region 22, and the output region 24. The waveguide core 12 has a sidewall 62 and a sidewall 64 opposite to the sidewall 62, and the waveguide core 14 has a sidewall 66 and a sidewall 68 opposite to the sidewall 66. The cladding layer 38 is disposed in the coupling region 22 inside the gap G3 between the sidewall 62 of the waveguide core 12 and the sidewall 66 of the waveguide core 14, as well as in the space between the waveguide core 12 and the waveguide core 14 in the input region 20 and in the space between the waveguide core 12 and the waveguide core 14 in the output region 24. In an alternative embodiment, the waveguide cores 12, 14 may be slotted waveguide cores, and the material of the cladding layer 40 may be disposed inside the slots.

Figure 9:
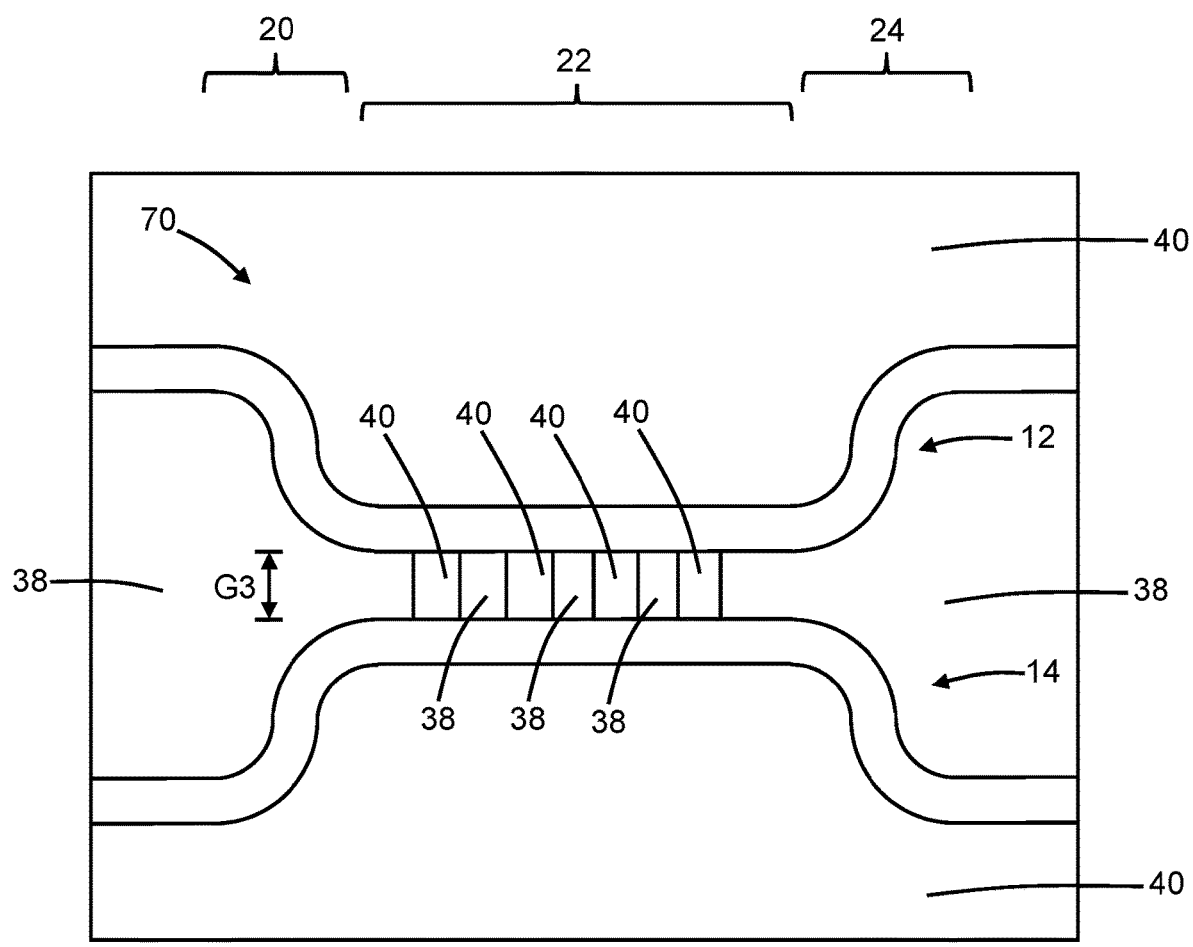
FIG. 9 is a top view of a structure in accordance with alternative embodiments of the invention.

With reference to FIG. 9 and in accordance with alternative embodiments, the structure 70 may include the material of both cladding layers 38, 40 inside the gap G3 over the coupling region 22. Specifically, sections of the cladding layer 40 may alternate with sections of the cladding layer 38 to define a grating-like arrangement inside the gap G3 over the length of the coupling region 22. The sections of each of the cladding layers 38, 40 may be defined when patterning the respective deposited layers. In an embodiment, the sections of the cladding layer 38 and the sections of the cladding layer 40 may be arranged to define a sub-wavelength grating inside the gap G3.

Figure 10:
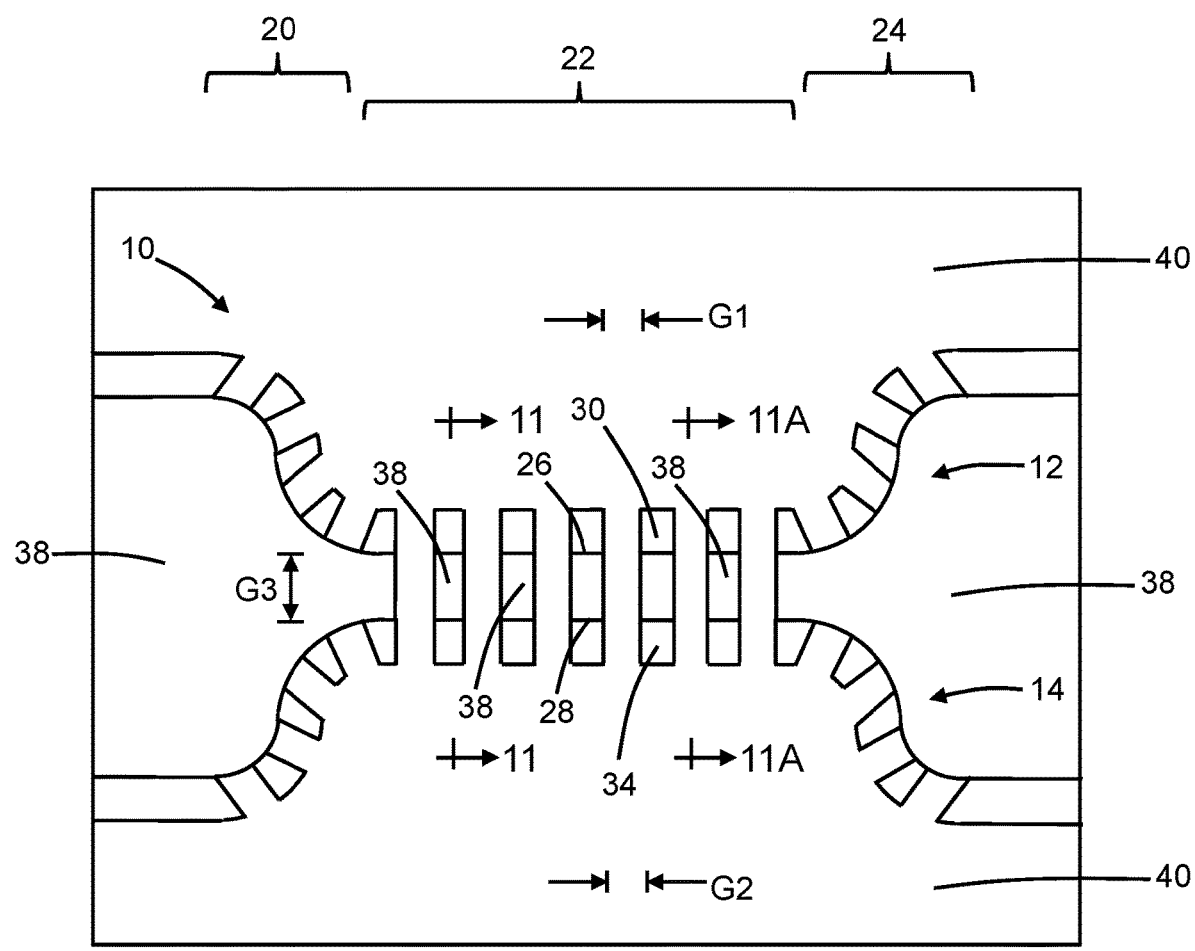
FIG. 10 is a top view of a structure in accordance with alternative embodiments of the invention.
Figure 11:
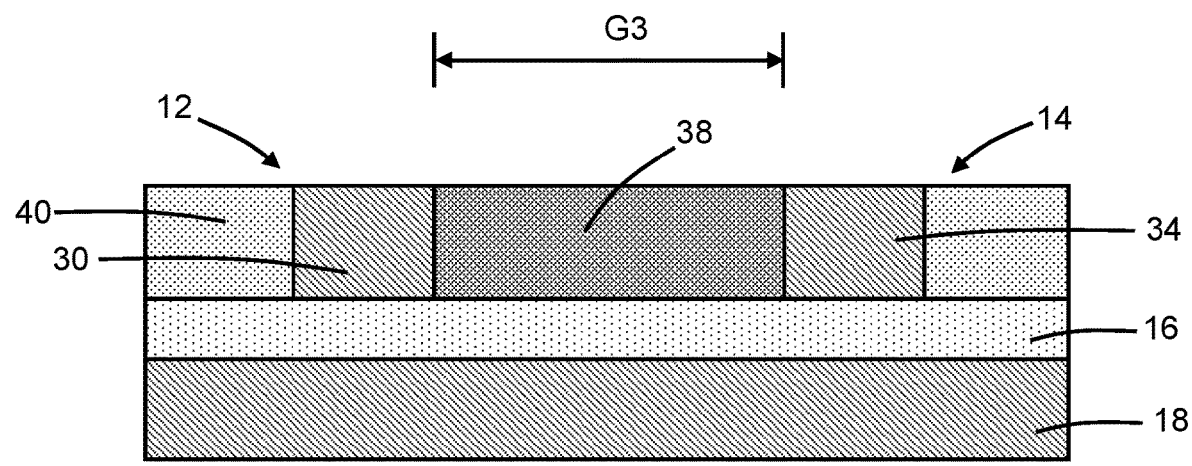
FIG. 11 is a cross-sectional view taken generally along line 11-11 in FIG. 10.
Figure 11A:
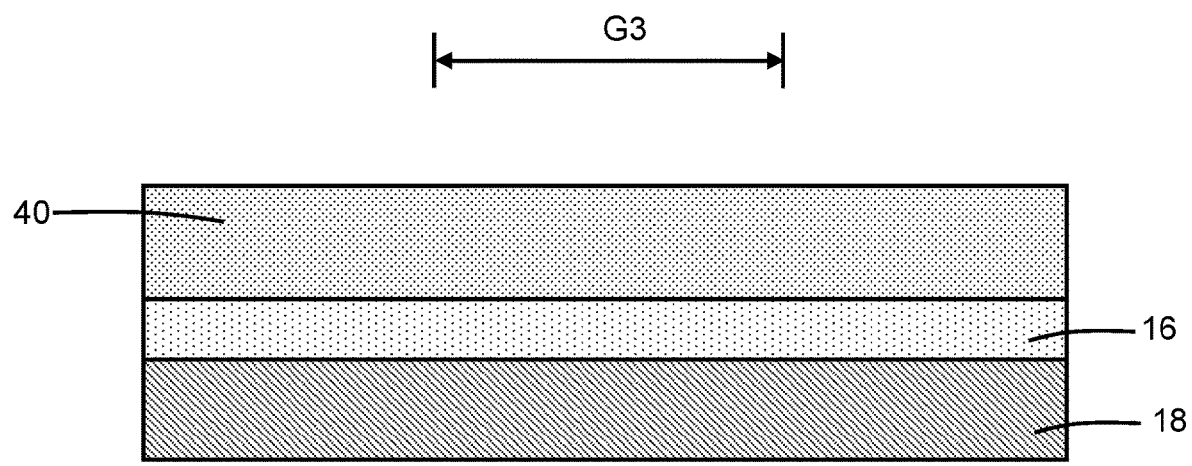
FIG. 11A is a cross-sectional view taken generally along line 11A-11A in FIG. 10.

With reference to FIG. 10, 11, 11A and in accordance with alternative embodiments, the material of the cladding layer 40 may be disposed in the gaps G1 between adjacent pairs of the segments 30 in the coupling region 22 and in the gaps G2 between adjacent pairs of the segments 34 in the coupling region 22. The material of the cladding layer 38 may be disposed in the portions of the gap G3 between the sidewalls 26 of the segments 30 and the sidewalls 28 of the segments 34 that are arranged across the gap G3 from each other. As a result, the materials inside the gap G3 have refractive indices that alternate along the length of the coupling region 22 of the structure 10.

Figure 12:
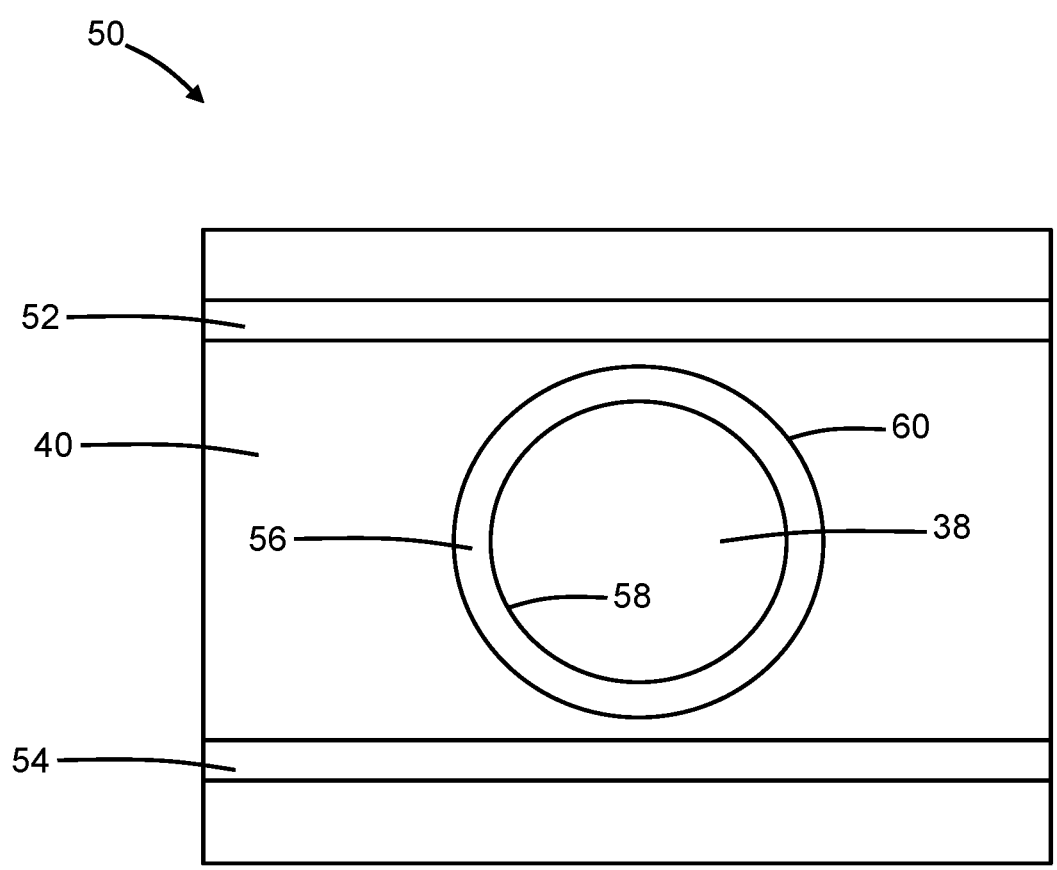
FIG. 12 is a top view of a structure in accordance with alternative embodiments of the invention.

With reference to FIG. 12 and in accordance with alternative embodiments, a structure 50 for a directional coupler may include a waveguide core 52, a waveguide core 54 and a ring resonator 56 positioned adjacent to respective portions of the waveguide cores 52, 54. In an embodiment, the ring resonator 56 may be positioned adjacent to the waveguide core 52 with a gap separating the ring resonator 56 from the portion of the waveguide core 52, and the ring resonator 56 may be positioned adjacent to the waveguide core 54 with a gap separating the ring resonator 56 from the portion of the waveguide core 54. In an embodiment, the ring resonator 56 may be a waveguide core that is shaped as a closed loop or ring. The waveguide core 52 may serve as an input bus, and the waveguide core 54 may serve as an output bus. The ring resonator 56 may have an inner ring-shaped edge 58 defining an inner diameter and an outer ring-shaped edge 60 defining an outer diameter.

In an embodiment, the cladding layer 38 may be formed inside the inner ring-shaped edge 58 of the ring resonator 56, and the cladding layer 40 may be formed outside the outer ring-shaped edge 60 of the ring resonator 56. In an alternative embodiment, the waveguide core of the ring resonator 56 may be divided into segments, the segments may be arranged within the ring shape to define a sub-wavelength grating, and either the material of the cladding layer 38 or the material of the cladding layer 40 may be arranged in the gaps between the segments. In an embodiment, the waveguide cores 52, 54 and the waveguide core of the ring resonator 56 may be comprised of the same material, such as silicon. In an alternative embodiment, an additional ring resonator may be positioned between the waveguide cores 52, 54 adjacent to the ring resonator 56.

In use, light (e.g., laser light) may be coupled and transferred in a lateral direction from the waveguide core 52 to the ring resonator 56. The light may be subsequently coupled and transferred in a lateral direction from the ring resonator 56 to the waveguide core 54. The result is light transfer from the waveguide core 52 to the waveguide core 54.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a directional coupler, the structure comprising:
    a first waveguide core including a first plurality of segments, each of the first plurality of segments having a first sidewall and a second sidewall opposite to the first sidewall;
    a second waveguide core including a second plurality of segments, each of the second plurality of segments having a first sidewall and a second sidewall opposite to the first sidewall, the second plurality of segments spaced from the first plurality of segments by a first gap in a coupling region, and the first sidewall of each of the second plurality of segments disposed across the first gap from the first sidewall of one of the first plurality of segments in the coupling region;
    a first cladding layer comprising a first dielectric material that has a first refractive index, the first cladding layer adjoining the first sidewall of each of the first plurality of segments and the first sidewall of each of the second plurality of segments; and
    a second cladding layer comprising a second dielectric material that has a second refractive index greater than the first refractive index, the second cladding layer adjoining the second sidewall of each of the first plurality of segments and the second sidewall of each of the second plurality of segments.

2. The structure of claim 1 wherein the first waveguide core includes a plurality of second gaps that alternate with the first plurality of segments along a first longitudinal axis, the second waveguide core includes a plurality of third gaps that alternate with the second plurality of segments along a second longitudinal axis, and the first cladding layer is disposed in the plurality of second gaps and the plurality of third gaps.

3. The structure of claim 2 wherein the first plurality of segments of the first waveguide core are arranged in a first sub-wavelength grating, and the second plurality of segments of the second waveguide core are arranged in a second sub-wavelength grating.

4. The structure of claim 1 wherein the first waveguide core includes a plurality of second gaps that alternate with the first plurality of segments along a first longitudinal axis, the second waveguide core includes a second plurality of third gaps that alternate with the first plurality of segments along a second longitudinal axis, and the second cladding layer is disposed in the plurality of second gaps and the second plurality of third gaps.

5. The structure of claim 4 wherein the first plurality of segments of the first waveguide core are arranged in a first sub-wavelength grating, and the second plurality of segments of the second waveguide core are arranged in a second sub-wavelength grating.

6. The structure of claim 1 wherein each of the first plurality of segments has a bottom surface, each of the second plurality of segments has a bottom surface, and further comprising:
    a dielectric layer comprised of a third dielectric material, wherein the bottom surface of each of the first plurality of segments is disposed on the dielectric layer, and the bottom surface of each of the second plurality of segments is disposed on the dielectric layer.

7. The structure of claim 6 wherein the third dielectric material has a third refractive index that is different from the first refractive index.

8. The structure of claim 6 wherein the first cladding layer and the second cladding layer are disposed on the dielectric layer.

9. The structure of claim 1 wherein each of the first plurality of segments has a top surface, each of the second plurality of segments has a top surface, and further comprising:
    a dielectric layer comprised of a third dielectric material, wherein the dielectric layer is disposed on the top surface of each of the first plurality of segments, and the dielectric layer is disposed on the top surface of each of the second plurality of segments.

10. The structure of claim 9 wherein the third dielectric material has a third refractive index that is different from the first refractive index.

11. The structure of claim 9 wherein the dielectric layer is disposed on the first cladding layer and the second cladding layer.

12. The structure of claim 1 wherein the first dielectric material comprises a first non-ferroelectric material, and the second dielectric material comprises a second non-ferroelectric material.

13. The structure of claim 1 wherein the first dielectric material and the second dielectric material are selected from silicon nitride, aluminum nitride, silicon oxynitride, diamond, aluminum oxide, calcium fluoride, carbon-doped silicon oxide, tetraethylorthosilicate silicon dioxide, fluorinated-tetraethylorthosilicate silicon dioxide, and magnesium fluoride.

14. The structure of claim 1 wherein the first waveguide core and the second waveguide core comprise single-crystal silicon.

15. The structure of claim 1 wherein the first waveguide core and the second waveguide core comprise silicon nitride, silicon oxynitride, or aluminum nitride.

16. The structure of claim 15 wherein the first waveguide core and the second waveguide core comprise single-crystal silicon.

17. The structure of claim 1 wherein the second plurality of segments are spaced from the first plurality of segments by a first distance greater than the first gap in an input region, the first plurality of segments are arranged with curved routing in the input region, and the second plurality of segments are arranged with curved routing in the input region.

18. The structure of claim 17 wherein the second plurality of segments are spaced from the first plurality of segments by a second distance greater than the first gap in an output region, the first plurality of segments are arranged with curved routing in the output region, and the second plurality of segments are arranged with curved routing in the output region.

19. The structure of claim 1 wherein the second plurality of segments are spaced from the first plurality of segments by a second distance greater than the first gap in an output region, the first plurality of segments are arranged with curved routing in the output region, and the second plurality of segments are arranged with curved routing in the output region.

20. A method of forming a structure for a directional coupler, the method comprising:
   forming a first waveguide core including a first plurality of segments, wherein each of the first plurality of segments has a first sidewall and a second sidewall opposite to the first sidewall;
   forming a second waveguide core including a second plurality of segments, wherein each of the second plurality of segments has a first sidewall and a second sidewall opposite to the first sidewall, the second plurality of segments spaced from the first plurality of segments by a first gap in a coupling region, and the first sidewall of each of the second plurality of segments is disposed across the first gap from the first sidewall of one of the first plurality of segments in the coupling region;
   forming a first cladding layer comprising a first dielectric material having a first refractive index, wherein the first cladding layer adjoins the first sidewall of each of the first plurality of segments and the first sidewall of each of the second plurality of segments; and
   forming a second cladding layer comprising a second dielectric material that has a second refractive index greater than the first refractive index, wherein the second cladding layer adjoins the second sidewall of each of the first plurality of segments and the second sidewall of each of the second plurality of segments.

\* \* \* \* \*